United States Patent [19]

Dix et al.

[11] 4,104,724

[45] Aug. 1, 1978

[54] DIGITAL WELDER CONTROL SYSTEM

[75] Inventors: James Allen Dix, Greenfield; Marvin A. Guettel, Milwaukee; Michael Aslin, Cedarburg, all of Wis.

[73] Assignee: Square D Company, Park Ridge, Ill.

[21] Appl. No.: 809,959

[22] Filed: Jun. 27, 1977

[51] Int. Cl.² .................. G06F 15/46; B23K 9/12
[52] U.S. Cl. ............................. 364/477; 219/108; 364/107; 364/119
[58] Field of Search ............ 364/477, 107, 118, 119, 364/120, 200 MS File, 900 MS File; 219/108, 110, 111, 114, 115, 124, 125 PL, 125 R, 131 R, 136, 137 R, 137 PS; 307/31, 34, 35

[56] References Cited

U.S. PATENT DOCUMENTS

| | | | |
|---|---|---|---|
| 3,519,786 | 7/1970 | Roberts | 219/114 X |
| 3,555,239 | 1/1971 | Kerth | 219/125 R |
| 4,001,540 | 1/1977 | Drake et al. | 219/110 |
| 4,034,212 | 7/1977 | Paxton | 219/108 X |

*Primary Examiner*—Joseph F. Ruggiero
*Attorney, Agent, or Firm*—Michael J. Femal

[57] ABSTRACT

A digital welder control system for controlling a portable gun welder of the type used in the automotive industry on an assembly line. An 8 bit microprocessor is the main control element of the system. The known cycle time of the microprocessor is used to generate a real time delay which in turn is used to generate a digital phase shift heat control. RAM locations in the microprocessor are used to store medium constants of the welding sequence which were previously stored, in prior art controls, in the position of tap switches or thumbwheel switches. The controller provides diagnostics for six common problems often encountered by welder control systems such as override timeout, half cycling, transformer temperature rises, a low water flow, a shorted SCR, and a change in the heat settings. The controller also provides a maintenance interval counter and compensator control having a four-step stepper. The stepper control is used to automatically increase the weld heat after a preset number of welds to compensate for electrode mushrooming. The controller also checks the setting of address and data thumbwheels to prevent incorrect entries into the welding sequence. The controller also permits entry of data only into RAM locations which are used in the normal sequence of the welder. The controller also utilizes serial communication between a sequence module used to program the microprocessor and the microprocessor to economize on the number of drivers and receivers required and to reduce the power requirements of the controller.

9 Claims, 13 Drawing Figures

| PROGRAM WORK SHEET | | | | | | |
|---|---|---|---|---|---|---|
| FUNCTION | SEQUENCE 1 | | SEQUENCE 2 | | SEQUENCE 3 | |
| | ADDRESS | DATA | ADDRESS | DATA | ADDRESS | DATA |
| SQUEEZE (CYCLES) | 10 | | 20 | | 30 | |
| WELD 1 (CYCLES) | 11 | | 21 | | 31 | |
| PERCENT CURRENT (WELD 1) (%) | 12 | | 22 | | 32 | |
| COOL (CYCLES) | 13 | | 23 | | 33 | |
| WELD 2 (CYCLES) | 14 | | 24 | | 34 | |
| PERCENT CURRENT (WELD 2) (%) | 15 | | 25 | | 35 | |
| HOLD (CYCLES) | 16 | | 26 | | 36 | |
| OFF (CYCLES) | 17 | | 27 | | 37 | |

| | | |
|---|---|---|
| SQUEEZE DELAY (CYCLES) (COMMON TO ALL GUNS) | 40 | |

| M.I.C.C. | STEP 1 | | STEP 2 | | STEP 3 | | STEP 4 | |
|---|---|---|---|---|---|---|---|---|
| | ADDRESS | DATA | ADDRESS | DATA | ADDRESS | DATA | ADDRESS | DATA |
| WELD COUNT * | 50 | | 51 | | 52 | | 53 | |
| PERCENT CURRENT SEQ. 1 (%) | 60 | | 61 | | 62 | | 63 | |
| PERCENT CURRENT SEQ. 2 (%) | 70 | | 71 | | 72 | | 73 | |

* STEP 1 (x10) – ALL OTHER STEPS (x100)

| DIAGNOSTICS | DISPLAY (FLASHING) |
|---|---|
| OVERRIDE TIME-OUT | 99 |
| HALF-CYCLING | 98 |
| TRANSFORMER TEMPERATURE | 97 |
| LOW WATER FLOW | 96 |
| SHORTED SCR | 95 |
| CHECK HEAT SETTLING | 93 |

| M.I.C.C. | ADDRESS |
|---|---|
| STEP NUMBER | 89 |
| WELD COUNTER * | 88 |

FIG. 9b
VOLTAGE ACROSS SCR

DIGITAL WELDER CONTROL SYSTEM

BACKGROUND OF THE INVENTION

This invention relates to a portable gun welder control system and more particularly to a digital welder control system for the automotive industry in which the controller utilizes a microprocessor and modular interconnections.

Portable gun welders have been used for many years in the automotive indUstry, but the automation of the welding operation for assembly line work has introduced many problems in providing adequate control of the welding sequence. Previously, welding parameters such as squeeze time, weld time, heat intensity, cool period, etc., were programmed by an operator who dialed numerous sets of concentric switches and potentiometers on a control panel. The dial area of this control panel become crowded as well as introducing a possible error by the operator in setting the numerous switches and potentiometers on the control panel.

Another problem encountered by prior art controllers was in setting the welding heat intensity to a preselected value. The prior art used RC time delay which was somewhat temperature dependent so that the time delays did vary to a degree with operating temperature. Prior art controllers also used a continuously variable potentiometer which did not have precise known points corresponding to small increments of heat such as steps of 1% increment of heat. In addition, the accuracy of the heat settings achieved with the potentiometers often varied as much as ±10% or more depending upon the age or atmosphere in which the potentiometers operated. Even devices which use a stable oscillator as a timing reference and count by using integrated circuits to generate accurate time delays, are subject to error because the accuracy of the device depends upon a stable and precise reference frequency.

Prior art welder control systems also did little or nothing in the area of diagnosing malfunctions. Some malfunctions of the controllers are obvious and can be quickly diagnosed and remedied. However, in some instances, it is not readily apparent what exactly is wrong with the welder control system. In assembly line production, a problem which cannot be diagnosed quickly can lead to costly down time if a number of the portable gun welders are out of operation due to any number of possible malfunctions in a welding control system. For instance, the timing period in a sequence might extend beyond its normal period. One or both of the SCR's in a thyristor contactor might fail to fire causing half cycling of the welder transformer and eventual saturation and destruction of the same. A rise in the transformer temperature above its normal operating temperature would be an important factor to know. A low water flow to the thyristor contactor which should cause an overheating and failure of the same would also be an important factor to know. Moreover, a shorted SCR or an improper heat setting would be a further malfunction and error, respectively, that must be quickly diagnosed and remedied.

Another disadvantage in prior art welder control systems is that the circuit for the heat control used the zero crossing of the voltage wave form as a reference for generating the time delay signal. This technique required the controller be tuned to the power factor of the installation. Timing in these types of controllers was accomplished by taking the zero crossing of the voltage wave form with a correction for a particular power factor of the installation. Each time a controller is installed, a potentiometer on the controller is adjusted to tune the controller to the installation. Although tuning the controller is normally an adequate remedy, the power factor often varies due to a different gun configuration or to a dynamic change with a different work piece in the throat of the gun, In these instances, the heat control takes on some error because of the welder controller's inability to account for the changes in the power factor.

SUMMARY OF THE INVENTION

With this invention, the foregoing problems are substantially solved. The digital portable gun welder control system is comprised of either two or three modules: a contactor module and a sequence module or a contactor module, a sequence module, and a junction box, respectively. The welder control system utilizes an 8 bit microprocessor as its main control element. The microprocessors known cycle time is used to generate a real time delay which in turn is used to generate a phase shift heat control. The random access memory (hereinafter called RAM) of the microprocessor is used to store constants of the weld sequence previously stored in position of tap switches or thumbwheel switches. The welder control system monitors existing signals already in the controller to generate diagnostic messages which indicate malfunctions in the welder control system. The welding controller also includes a maintenance interval counter and compensator which is a four-step, stepper control used to automatically increase the weld heat after a preset number of welds to compensate for welder tip mushrooming which is most prevalent in welding galvanized metal in the auto industry. The welder control also includes programming checks that eliminate invalid data entries to the welding sequence. Only locations in the RAM which are used in the normal welding sequence can be written into. The welder control system utilizes a serial communication between the sequence module and the microprocessor in the contactor module.

Accordingly, a principal object of the present invention is to provide a portable gun welder control system for the automotive industry that utilizes a digital phase shift heat control which automatically compensates for changes in the power factor of the installation so that the heat intensity does not vary from the programmed setting.

Another object of the present invention is to provide a portable gun welder control system for the automotive industry which utilizes the RAM in the controller's microprocessor to store the constants of the weld sequence previously stored in the position of tap switches, potentiometers or thumbwheel switches that often cause reliability problems by the sheer number of switches potentiometers required to be set by an operator or the possible failure of a hardware interconnection of the switches.

A further object of the present invention is to provide a portable gun welder control system for the automotive industry in which common problems that are often encountered by a welder control system but which are difficult to diagnose and remedy, are highlighted and identified by the controller to reduce down time and maintenance requirements of the controller.

Yet another object of the present invention is to provide a portable gun welder control system for the automotive industry that includes a maintenance interval counter and compensator to automatically increase the weld heat after a preset number of welds in each step to compensate for electrode mushrooming.

Still another object of the present invention is to provide a portable gun welder control system for the automotive industry in which invalid data entries into the welding sequence are eliminated.

Moreover, another object of the present invention is to provide a portable gun welder control system for the automotive industry in which only RAM locations in the normal welding sequence can be written into to avoid malfunctions within the controller.

Still further, another object of the present invention is to provide a portable gun welder control system for the automotive industry that utilizes a serial communication between the sequence module and the microprocessor in the contactor module to reduce the requirement of additional drivers and receivers between the sequence module and the microprocessor and to reduce power requirements therebetween.

Another object of the present invention is to provide a portable gun welder control system for the automotive industry in which the controller is divided into several modules, each containing one or more removable circuit boards and each interconnected to its associated module by disconnect plugs so that a malfunctioning module or one of its circuit boards can easily be serviced by simply substituting another module or circuit board.

Other objects and advantages will become apparent from the description wherein reference is made to the accompanying drawings illustrating the preferred embodiments of the invention.

DESCRIPTION OF THE PREFERRED EMBODIMENT

Figure 1:
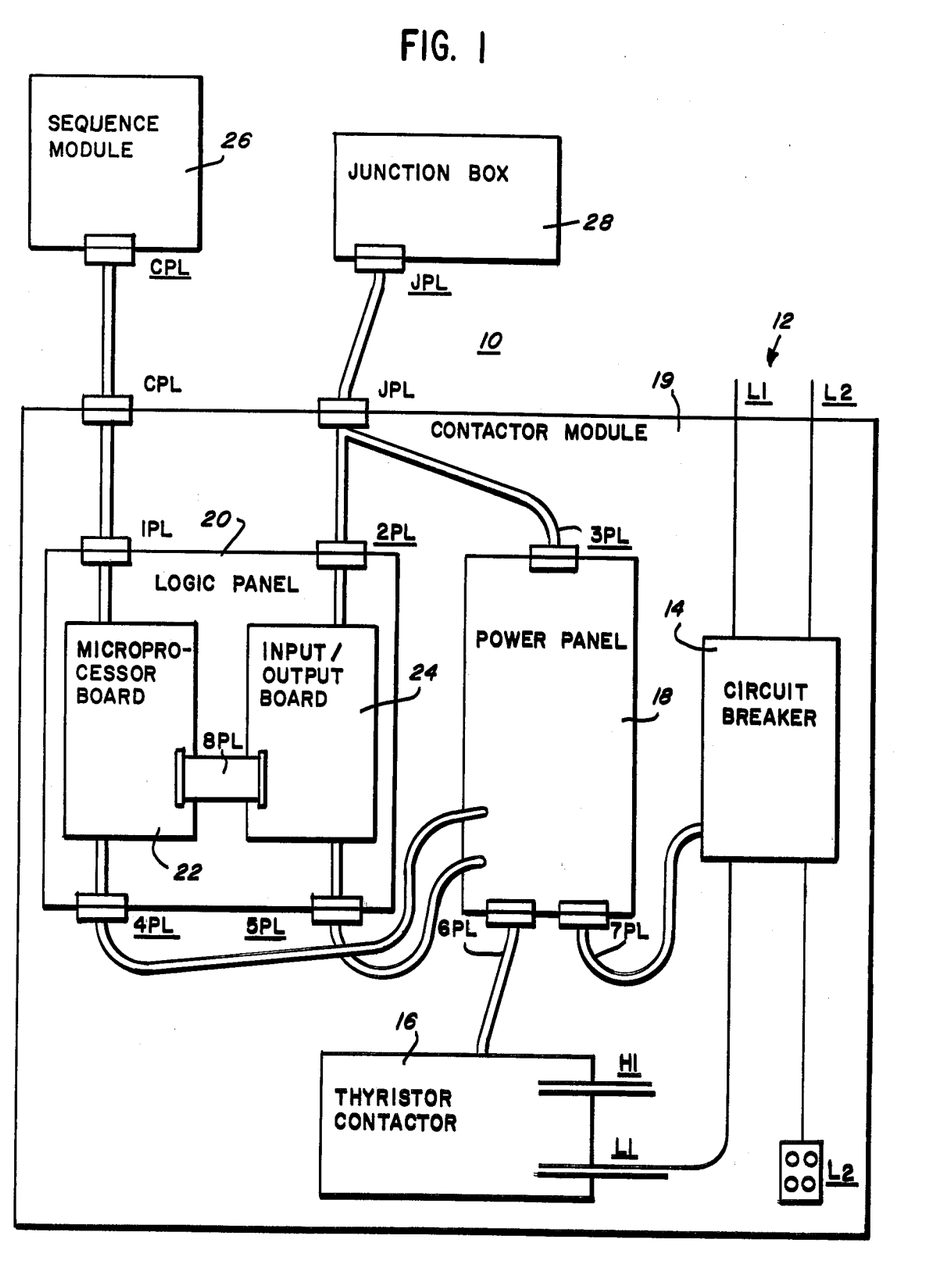
FIG. 1 shows a block diagram of the module interconnections for the welding control system embodying the principals of the present invention.
Figure 6:
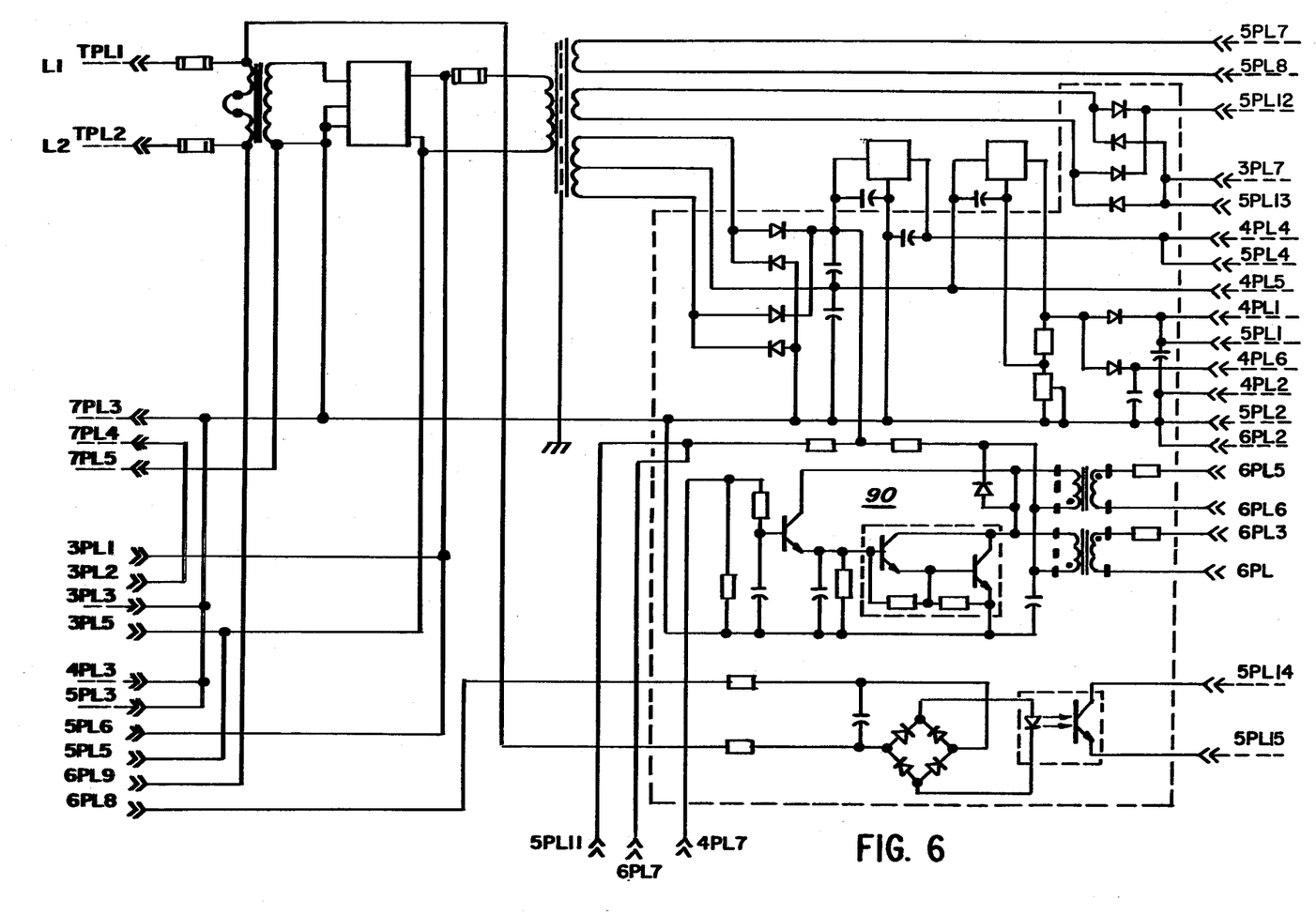
FIG. 6 shows a circuit diagram of the power panel of FIG. 1.
Figures 7, 9A:
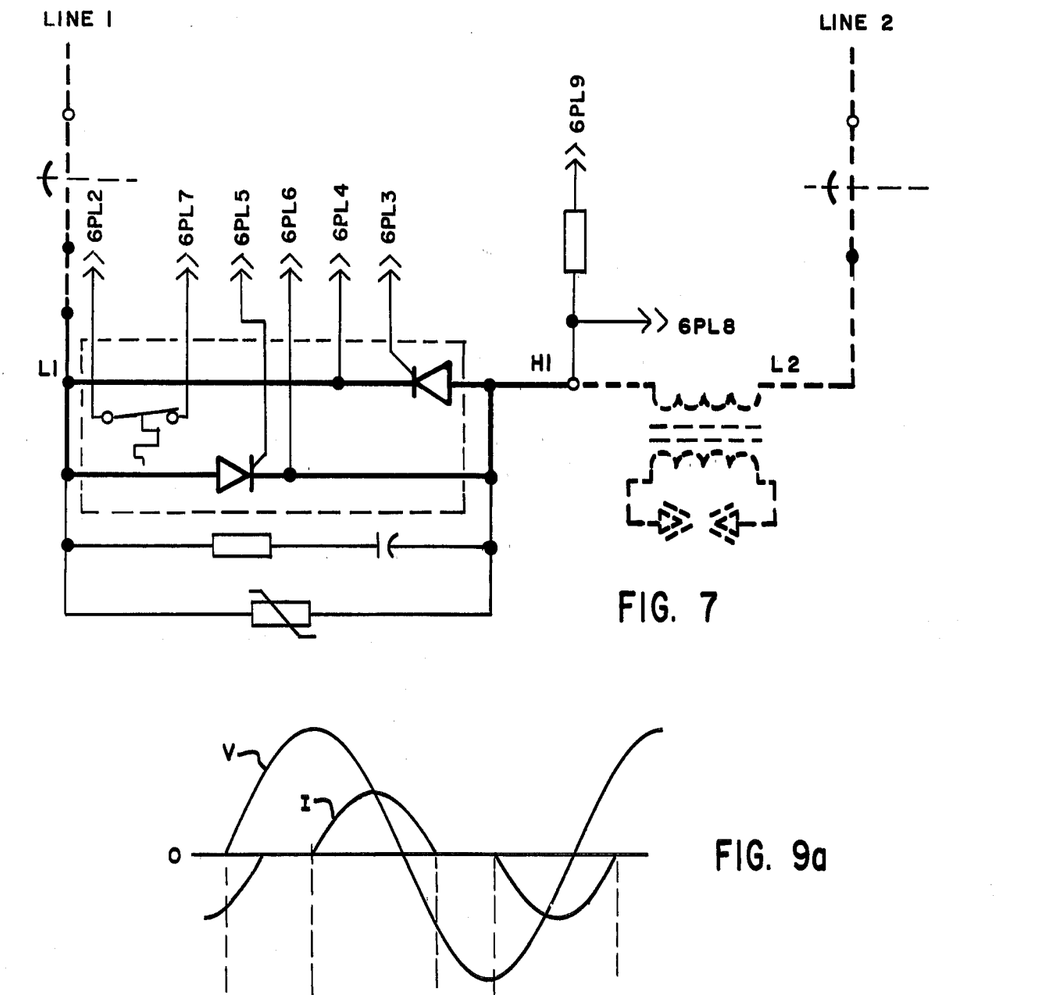
FIG. 7 shows a circuit diagram of the thyristor contactor of FIG. 1.
FIGS. 9A-C illustrates graphically the voltage wave forms and signal level in the embodiment of FIG. 1.

Referring to FIG. 1, the digital welder control system 10 that can be used in any general, industrial or commercial installation is connected to a power source, such as an alternating current power source 12 having lines L1 and L2, which are connected in any known manner through a service entrance breaker 14. Line L2 is connected to the primary of the welding transformer and L1 is connected to the primary of the welding transformer through thyristor contactor 16 as shown in FIG. 7. The circuit breaker side of power lines L1 and L2 are also connected to a power panel 18 through a cable 7PL as shown in FIG. 6. The power panel 18 is connected to the thyristor contactor 16 through power cable 6PL. A logic panel 20 contains a microprocessor board 22 and an input/output board 24 which are interconnected by a power cable 8PL. The microprocessor board 22 contains an 8-bit microprocessor of any known type (not shown) such as Motorola M6800. The 8-bit microprocessor includes read only memories registers containing the executive program, random access memories containing the program constants of the weld sequence, port registers and various gate and amplifying circuits interconnecting the above mentioned integrated circuits of the microprocessor in any known manner in the art. The microprocessor board also includes a battery for retaining the data stored in the RAM whenever the welding controller is de-energized. The battery in the data retention circuit for the RAM is trickle charged during normal operation when the welding controller is powered from the line and has a useful life of approximately 21 days for retention of the data in the RAMs when the welding controller is de-energized.

The input/output board (hereinafter called I/O board) 24 serves as an I/O signal conditioning to interface the processor bus. The I/O board also contains initiation and fault relays which energize and de-energizes the welder solenoid upon triggering the gun or upon a fault occurring, respectively. The I/O board also contains a solenoid amplifier for providing enough power to operate the selected solenoid.

The I/O board also contains an override timer. This timer is set so that it provides an output after approximately 70 cycles. All timing periods in the welding controller are restricted to no more than 59 cycles. During the operation of the controller and at the beginning of each timing period in the welding sequence, a pulse is provided to reset the override timer to zero. In normal operation, the override timer should never time out as it is continuously reset after each timing period, which is less than the time out time of the override timer. If one of the timing periods goes longer than 59 cycles the override timer will time out. The output of the override timer de-energizes the fault relay on the I/O board which de-energizes the welder solenoid and also provides an interrupt signal to the microprocessor which causes the microprocessor to execute and interrupt subroutine which locks out the welding controller. Both the microprocessor and I/O boards communicate with the power panel through cables 4PL and 5PL, respectively. The logic panel 20, power panel 18, thyristor contactor 16 and circuit breaker 14 are housed within the contactor module 19.

A sequence module 26 communicates with the microprocessor board in the contactor module through cables CPL and 1PL. The sequence module 26 provides a means for entering the weld schedule and interrogating the microprocessor to be described in greater detail later. It also displays a diagnostic readout and includes the operator controls of the welding controller.

A junction box 28 interconnects with the I/O board and the power panel through cable JPL which branches into cables 2PL to the I/O board and 3PL to the power panel. The junction box is a convenient way of hooking solenoid valve and trigger signals to the controller at a remote location. The junction box includes user connections, light indicators for initiation and solenoid functions which indicate initiation of one of the three welding sequences and closure of the solenoid valve, a tip maintenance light, and a power off pushbutton for the shunt trip on a breaker to kick it out in an emergency stop condition.

Figure 2:
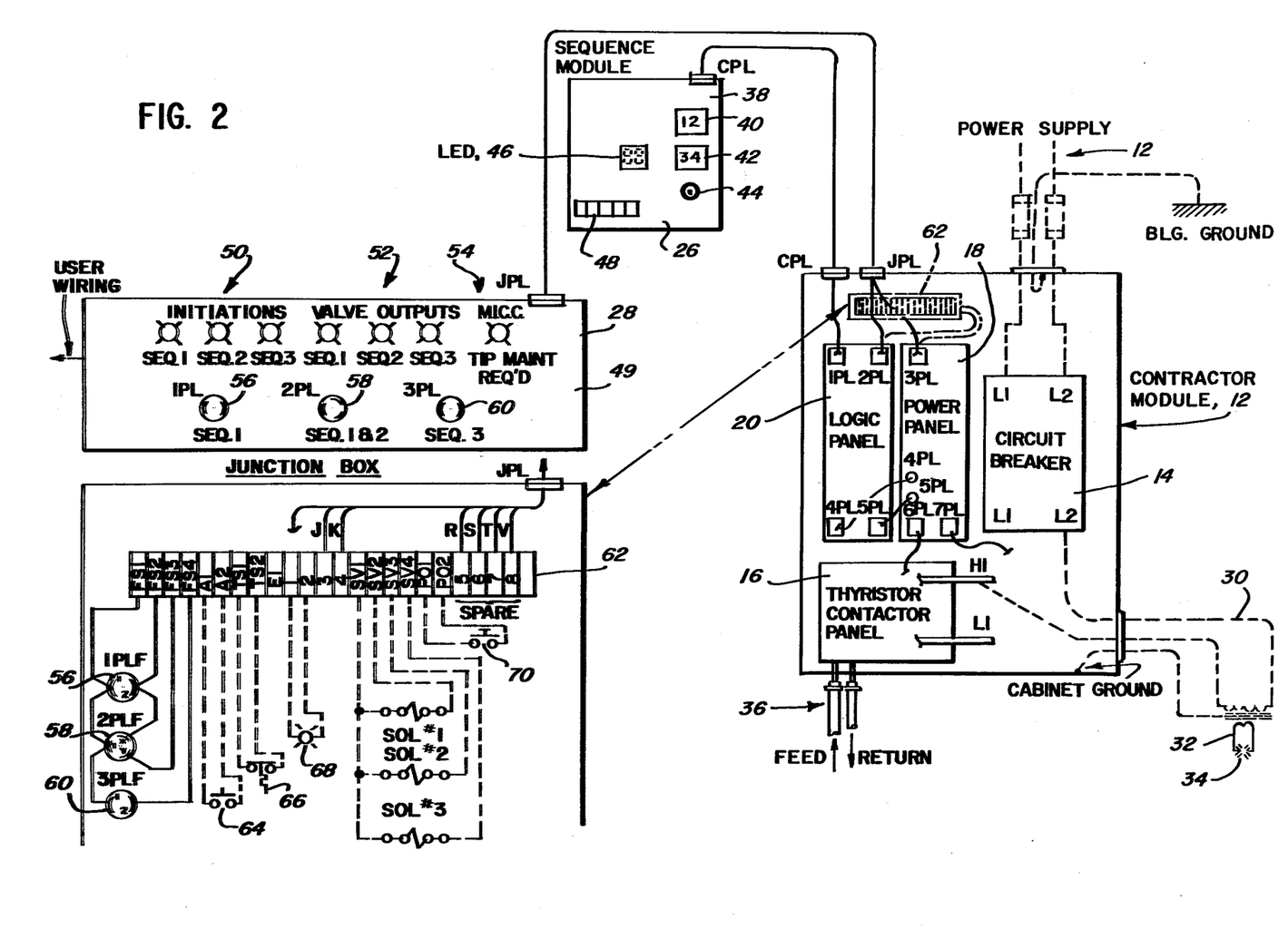
FIG. 2 is a partial block and schematic representation of a portion of certain electrical relationships which can exist in the block diagram of FIG. 1.

Referring now to FIG. 2, incoming power supply lines L1 and L2 can be fused prior to entering the contactor module and connecting with the circuit breaker 14. The welding transformer primary 30 connects at one terminal to power supply line L2 and its other terminal is connected to terminal H1 of the thyristor contactor panel 16 (see FIG. 7). The core of the transformer is grounded to the cabinet ground and its secondary 32 is connected to the welding electrodes 34 in a manner well-known in the art. In actual usage, the transformer is mounted on a counter weight balanced off the ceiling beams and its secondary is a concentric cable hanging from the transformer and terminating in a gun having solenoid operated electrodes that close on the workpiece when a trigger on the gun is pulled.

Water lines 36 flow to the thyristor contactor for cooling the same in any manner which is also well-known in the art.

The sequence module 26 has a front panel 38 including address and data thumbwheels 40 and 42, respectively to be described in greater detail later, a key operated run/program switch 44, and an LED data display 46 and a number of operator switches 48 all to be descrbed in greater detail later. Also shown in FIG. 2 is the front panel 49 of the junction box which contains the initiations and valve output indicators 50 and 52, respectively, for the three welding sequences along with the maintenance interval counter and compensator indicator 54. On the lower portion of the panel are three indicators 56, 58, and 60 for indicating the operation of sequence 1, sequence 1 and 2, and sequence 3, respectively. Below the junction box face 49 is its terminal board 62 which can be wired directly onto the contactor module if the junction box is omitted as shown in phantom. The terminal strip 62 can be wired for the following; at terminals A1 and A2, a remote maintenance interval counter and compensator (hereinafter called MICC) switch 64; at terminals TS1 and TS2 a transformer over temperature thermostat switch 66; at terminals 1 and 2 a remote MICC output indicator 68; at terminals SV1, SV2, SV3, SV4, solenoid valves 1, 2 and 3; and at terminals PO1 and PO2, a power off switch 70 (circuit breaker shunt trip).

Figure 3:
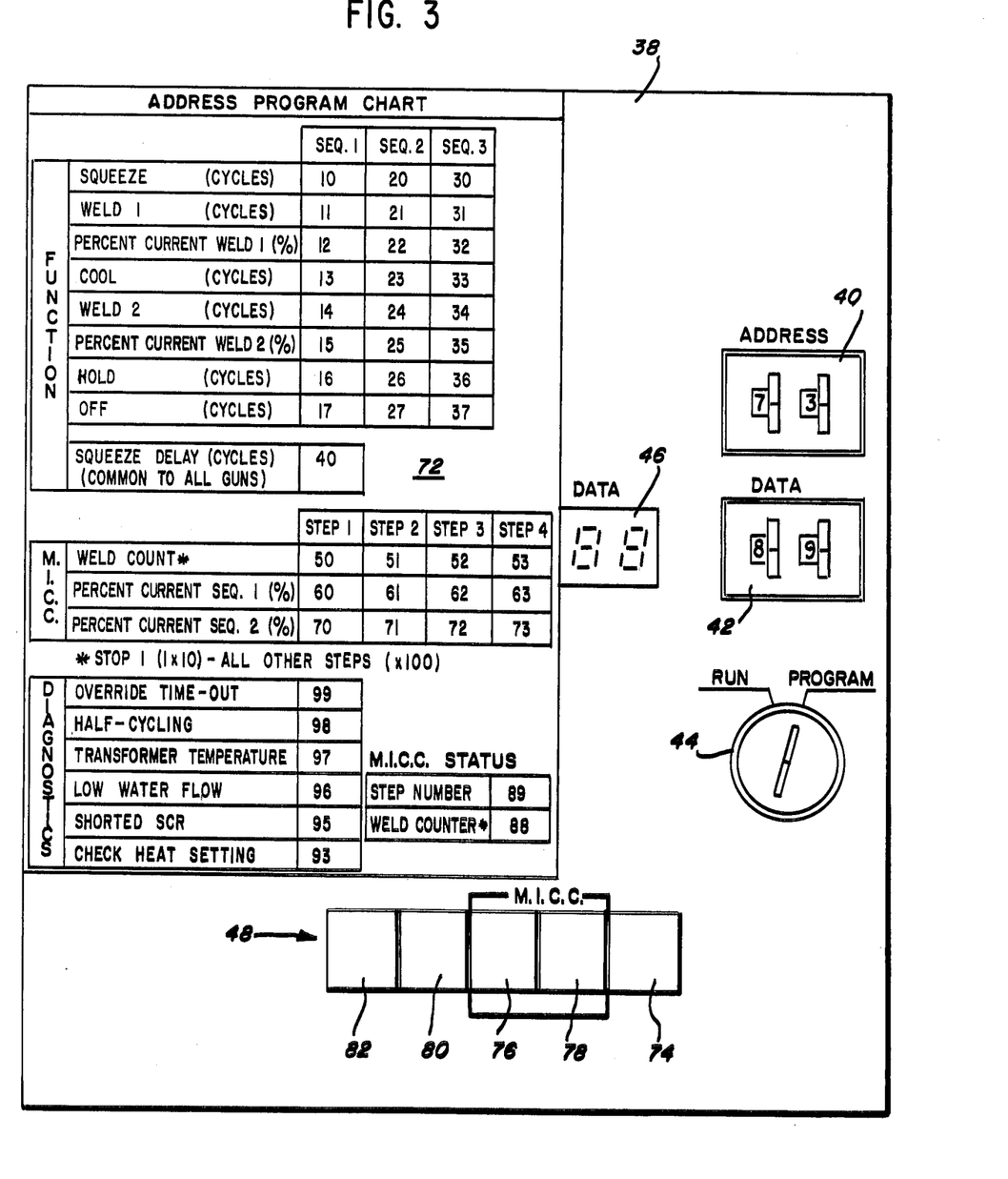
FIG. 3 is a front elevation of the sequence module front plate of FIG. 2.

Turning now to FIG. 3, the sequence module front plate 38 is shown in greater detail and the method of programming the welding controller will be discussed. The controller provides the capability of generating three weld sequences with the following timing periods:
squeeze delay 0-59 cycles (common to all sequences)
squeeze 0-59 cycles
weld 1 - 0-59 cycles
cool 2 0-59 cycles
hold 0-59 cycles
off 3-59 cycles
The percent current for both weld 1 and weld 2, corresponding to heat 1 and heat 2 respectively, can be set independently from 50-99%. The reason for three weld sequences, is that, in a typical assembly line in the automotive industry, an operator of the welder control often has a situation where there are three different weld schedules (sequences) required at his particular station on the assembly line. On one gun, there may be two triggers which allows two of the three sequences to be run. On another gun, which is on another secondary cable connected to the same welding transformer, he has one trigger; the operator is able to make the welds for two of the three sequences using the dual trigger gun, put it down, pick up the second gun and get the third weld sequence.

Sequences 1 and 2, at the operator's option, can be under the control of the four-step, stepper called the maintenance interval counter/compensator (hereinafter called MICC). The MICC is a fully programmed, four-step, stepper control used to automatically increase the weld heat after a preset number of welds. This feature is used to compensate for electrode mushrooming, most prevalent in welding galvanized metal in the automotive industry. When the MICC is on, the percent heat for both weld 1 and weld 2 are identical and are under control of the program set in the MICC schedule. In the top left hand portion of the module front plate 38 is an address program chart for the three welding sequences including the MICC and a diagnostics and MICC status numeral listing.

Now, a brief description of the function and operation of the controls on the sequence module front plate 38 used in conjunction with an address program chart 72 on front plate 38 will be presented. First, an operator selects a particular memory location (address) on the address program chart and dials the address thumbwheel 40 to that particular address number to examine or alter the data stored in this RAM location in the microprocessor. Next, if the operator intends to enter or alter the data (timing period cycles, percent current, etc.,) in the particular address selected by the address thumbwheels, the data to be entered is dialed on the data thumbwheels 42 and is actually entered into the RAM memory by depressing an enter/reset switch 74. The LED data display 46 displays the data currently stored in the memory location set on the address thumbwheels. So the operator can check to see if indeed the dialed data on the data thumbwheel 42 has been entered or not. During this period if a fault is detected by the diagnostics of the welding controller, the data display 46 preempts the address thumbwheel settings and flashes a number indicating a particular fault corresponding to one of the numbers found on diagnostics portion of the address program chart, The run/program switch 44 is a two position switch. In the run position, the welding controller may be initiated by closing one of the initiation switches such as a trigger on a portable welding gun. In the run position, the memory locations cannot be altered, however, they may be displayed by using the address thumbwheels and by viewing the data display 46. In the program position, the RAM memory locations may be altered, but the welding controller cannot be initiated by triggering the welding gun. The switch 44 is key operated and the key can only be removed in the run position. As state above, the enter/reset switch 74 is operated when the run/program switch 44 is in the program position. By depressing and releasing the enter/reset switch 74 the data settings on the data thumbwheels is entered into the RAM's location of the microprocessor for the function set on the address thumbwheels.

However, the microprocessor checks the incoming data to the RAMs so that invalid data entries are eliminated. As previously stated, timing periods are limited to the range of 0 to 59 cycles, and heats are limited to the range of 50 to 99%. When an entry of data is made, before it is written into or stored in the working location of the RAM, it is checked to determine whether it is within the above mentioned limits. If the data is not within the above limits the entry is rejected. Communication between the microprocessor and the sequence module results in the data from the sequence module being temporarily stored in three RAM locations. These locations are then examined to determine whether or not the data is valid and within the limits set in the executive program found in the ROMs of the microprocessor. If the data is valid, then it is transferred from the temporary storage location to the actual active memory location of the RAM which is accessed during the normal welding sequence. If the data is invalid, this transfer to an active RAM location does not occur. The advantage of this checking technique is that wrong pieces of data which could cause malfunction of the welding controller cannot be entered. Thus the possibility of human error is eliminated. Prior art controllers require mechanical stops in thumbwheel switches or the like when they are used as a storage medium. This technique eliminates special thumbwheels in order to keep the data entry within the limits. As stated above, the data is compared against the limits set in the executive program in the ROMs of the microprocessor. If it falls within the limits, it is valid and used. If it does not fall within the limits the entry is just rejected, requiring the operator to change and re-enter the data in order to successfully program the controller.

Another advantage of this technique over the prior art, is that many more pieces of information can be stored than would be practical with tap switches or thumbwheels for each piece of data in a welding sequence as on the old welding controllers. Such a number of thumbwheels or tap switches would cause reliability problems in the number of interconnection points required, not to mention the problems of cost, space and complexity. The microprocessor is by far a more efficient way of storing information than mechanical tap and thumbwheel switches. The only slight drawback is that the RAM is a volatile storage medium, which means it must be continuously powered to retain its information. This is provided, however, by the previously mentioned battery which is trickle charged during the period the welding controller is powered from the line. The battery provides the energy to retain the data in the RAM of the microprocessor for a minimum of 21 days which is more than an adequate safety margin.

Should one of the six diagnostic faults occur which are listed on the address program chart on module front plate 38, the welding controller will not initiate when the operator triggers the gun. After maintenance is carried out to correct the malfunction, depressing the enter/reset switch 74 will reset the welding controller after a fault. Then the data display 46 again displays the data for the address set on the address thumbwheels, and the welding controller may be initiated if desired.

A MICC on/off switch 76 on front panel 38 is a two position switch. With this switch in the off position, the MICC is disabled. The MICC is precluded from counting welds, the tip maintenance required light on the junction box 28, if on or flashing is extinguished, and both the remote (if used) and local MICC step advance switches are inoperative. In the on position, the MICC is operative, welds are counted, the tip maintenance required light is operative, and the MICC may be manually advanced.

A MICC step advance switch 78 on front panel 38 causes the MICC to advance to the next step in the stepping program by depressing the switch when the MICC on/off switch 76 is on. If the welding controller is currently in step 4, the MICC step advance switch will return it to step one. The remote MICC step advance switch 64 (FIG. 2) corresponds to the step advance switch 78. It may be connected to the user's terminal as previously described and performs the same function.

A repeat/non-repeat switch 80 on the front panel 38 is also a two position switch. In the repeat position, the control will continue to perform the weld sequence as long as the initiation switch is held closed. In the non-repeat position, closing any of the initiation switches will result in one weld sequence only. The initiation switch must be released and reclosed to perform another weld sequence.

A weld/no-weld switch 82 on the front panel 38 is also a two position switch. With this switch in the weld position, a welding current will be passed during the weld one and weld two timing periods. In the no-weld position, the welding controller can be sequenced but no weld current is passed.

Referring further to FIG. 3, the programming of the maintenance interval counter and compensator will be discussed. The MICC is basically a four-step, stepper that operates sequences one and two. The MICC is used to automatically increase the weld heat after a programmed number of welds to compensate for electrode mushrooming. What happens in a typical commercial usage is that on some coated metals the electrode tips deteriorate very fast and the operators are continually replacing tips several times a shift. But each time the operators replace the tips they are still interested in trying to get the most life out of the tips, which is done by upping the heat periodically during the welds as the tips deteriorate and the current density at the spot weld goes down. Also, when the MICC reaches step four, the light indicator 54 on the junction box 28 and/or the remote MICC output light 68 flashes, which is an indication that we are at the end of step four, and tip maintenance is required.

With the MICC on/off switch 76 in the on position, the welding controller ignores the percent current data entered for weld one and weld two for sequence one and two (addresses 12, 15, 22, 25 on the program chart). The percent current is controlled by the program entered in the MICC addresses.

Address 50 is the weld count times ten for step one. In address 50, the operator enters the number of welds divided by 10 to be made in step one. For example, if 80 welds are desired, the operator sets the address thumbwheel to 50 and sets the data thumbwheel to 08, depresses the enter switch 74 to enter 08 in address 50 in the RAM. The welding controller will perform 80 weld sequences at the step one percent heat and then automatically index to step 2. A dual pulse weld is considered to be one weld for the MICC purposes.

Normally, the programming of the MICC is done by the operator experimentally. The resultant program will depend on the weld schedules selected and on the different types of material to be welded. So after some experimentation, the operator would be able to determine an optimal program which would track the mushrooming of the welding tips with the number of welds and the amount of current required in each step, and also when the tips changes are required.

So for programming sequence 1, the operator enters in address 60, the percent current at which these 80 welds are to be made. This percent current applies to both the weld one and weld two timing periods. That is, a dual pulse weld under MICC control will have the same percent current for both pulses. However, the weld one and weld two times may be adjusted differently. In address 70, the operator enters the percent current for sequence two. Steps two, three, and four are programmed in a similar manner, with the exception that the program weld count is times 100 for these steps.

Addresses 88 and 89 when dialed display the status of the MICC. When an operator dials address 89, the LED data display 46 displays the step number (1 through 4) in which the MICC is in at that time. When the operator dial address 88, the LED data display 46 displays the number of welds completed in that step (since a 2 digit display is used, the number shown must be multiplied by 10 for step 1 and by 100 for step 2 thru 4). Each time the MICC enters a new step, the weld counter is zeroed.

When the MICC enters step 4, the red light 54, labeled, tip maintenance required, on the junction box 28 is lit. This is an indication to maintenance personnel that the MICC is in its last step and the tips will need attention soon. If an additional remote indication is desired, a 40 watt maximum light corresponding to light 68 in FIG. 2 can be connected to terminals 1 and 2 on the user's terminal strip in the contactor module or in the junction box as previously described. When the number of welds in step 4 are completed, the tip maintenance required light will flash on and off. If additional welds are made after the tip maintenance required light starts flashing, they will be made at the step 4 percent currents.

Theory of Operation

Figure 5:
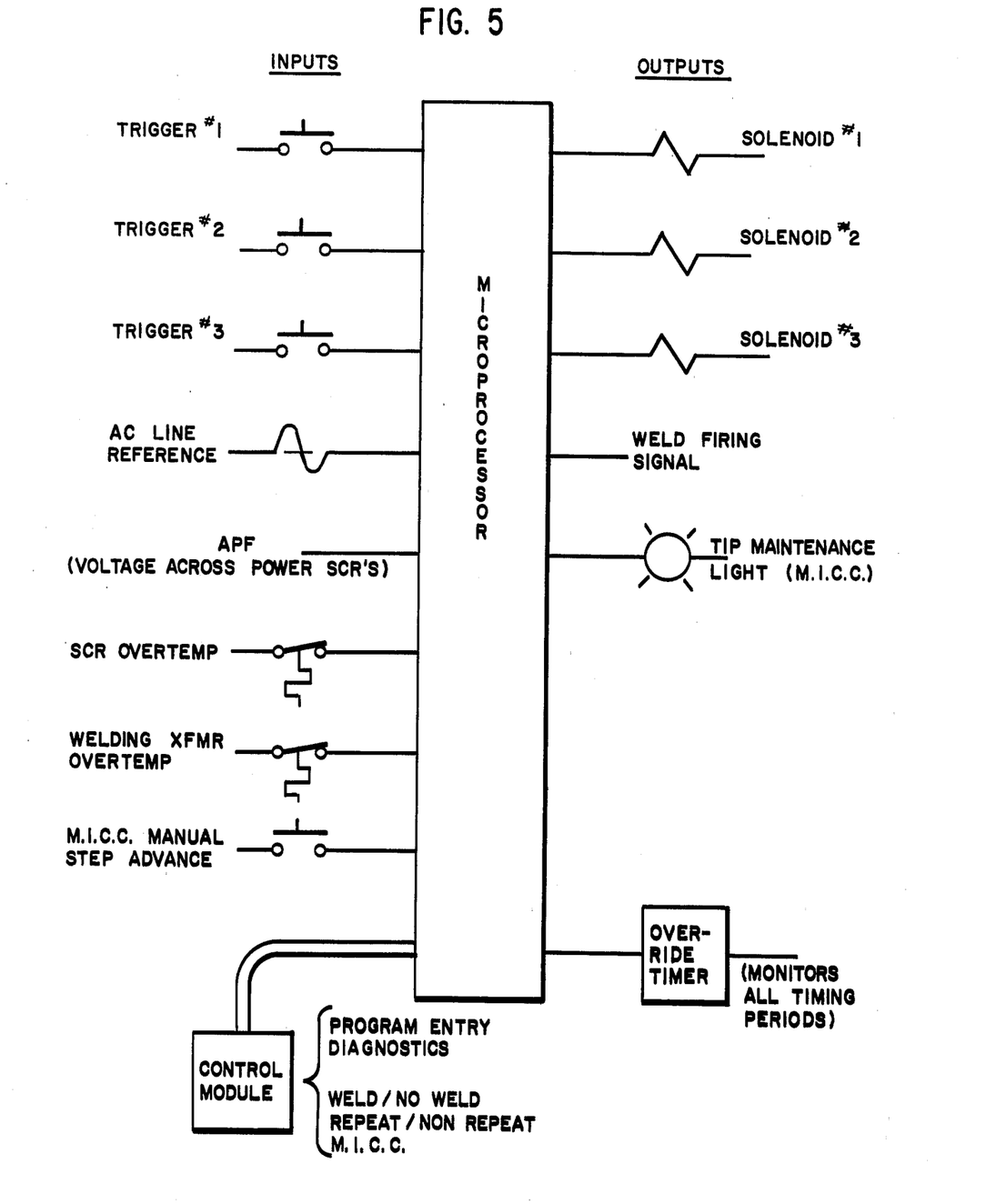
FIG. 5 is a block diagram of the inputs and outputs to the microprocessor of FIG. 1.

As previously stated, the controller utilizes an 8-bit microprocessor as its main control element. The software program to do the welding controller function resides in the programmable read-only memory (PROM). This memory is non-volatile, that is, the executive program is permanent, even with the memory unpowered. The constants for the weld schedule (squeeze-weld-hold-off times, percent heats, MICC counts, etc.) are stored in the programmable memory register (RAM). This RAM is volatile and requires standby power in the form of the previously mentioned battery to retain its data when the welding controller is de-energized. All control signals are interfaced to microprocessor via its input-output structure. FIG. 5 shows the input and output signals of the microprocessor. When power is applied to the welding controller, the microprocessor initializes itself as well as its supporting circuitry. Once the welding controller is initialized and is in a standby mode, there is communication between the sequence module 26 and the microprocessor. The microprocessor sends out 24 clock pulses, waits for approximately a millisecond, and repeats the series of 24 clock pulses. During the one millisecond break, shift registers in the sequence module are in a load mode. That is, information from enter/reset switch 74, MICC on/off switch 76, MICC step advance switch 78, repeat/non-repeat switch 80, and weld/no weld switch 82, and run/program switch 44 is entered into one of the registers called a switch register. The address and data thumbwheel settings are also entered and held in their respective shift registers. The 24 clock pulses, each in turn, shift one bit of data from the shift registers made up by the switch, address and data registers to the microprocessor. This information is retained in temporary locations in the RAMs. During the transfer of the data information from the sequence module to the microprocessor, the microprocessor also is generating display information for the LED data display 46 on the sequence module, which is captured by another shift register. This shift register feeds the binary coded decimal (hereinafter called BCD) to a pair of 7 segment decoder/drivers. These drive the shift registers of the 7 segment LED display. During a fault situation the normal job of displaying the contents of the location dialed on the address thumbwheel is preempted and the display 46 is used for displaying the error numbers. This communication is done by the microprocessor and it sends out the error code to be displayed for a second, and then blanks the display 46 for a second and then repeats with the error code. This alternating display and blanking of error code number gives the display a flashing action.

The shifting of one bit of information of each clock pulse from the sequence module to the microprocessor is a serial communication. The advantages of serial communication over parallel communication is that parallel communication requires many more wires and additional drivers and receivers between the sequence module and the microprocessor. This results in a savings of wire, connector points, and drivers and receivers, and power. Time constraints do not preclude using serial communication in the welding controller case, which means there is enough time to serialize and send one bit at a time between the sequence module and the microprocessor.

After initialization and the communication between the sequence module and the microprocessor, the welding controller remains in a standby mode until an initiation switch is closed such as a trigger on the portable welder gun. In the standby mode, the microprocessor continuously communicates with the sequence module as stated above.

On the triggering of the portable gun welder, the welding controller leaves the standby mode and starts to generate a weld sequence. As it starts the squeeze delay time it starts the override timer. The override timer is started at the beginning of each timing period in a sequence. If any timing period exceeds 59 seconds, the override timer times out. This causes the solenoid to drop out and the microprocessor to diagnose an override time-out as one of the six malfunctions of any welding controller. If a fault signal for displaying a flashing 99 on the LED data display 46 to indicate an override time-out condition is not required, the microprocessor then examines the three input signals as shown in FIG. 5 which are used to generate fault indications if a malfunction has occurred. These inputs are the automatic power factor (hereinafter called APF), SCR over-temperature, and transformer over-temperature signals. During all times except weld times, there should be a voltage present across the SCRs in the thyristor contactor. If there is not, a shorted SCR is indicated by a flashing 95 in the data display 46. If either of the thermostats is open, a corresponding fault is indicated by either a flashing number 96 or 97 in the LED data display 46.

If no fault conditions are present, the microprocessor generates an output signal for energizing the solenoid air value. The welding controller remains in the squeeze delay routine for the number of cycles equal to the contents of memory address location 40 in the RAM. The AC line reference input is examined in order to count the line cycles.

Next, the squeeze mode is checked, which is the same as the squeeze delay mode except the solenoid is energized if the squeeze mode was entered as a result of a repeat weld. In the case of a repeat weld, no squeeze delay time is generated.

After the squeeze time is completed, a weld 1 time mode is entered. On entering this mode, the microprocessor again resets the override timer. It then generates a delay so that the first half cycle of the weld is fired at the delayed firing angle 85°, because that is the natural power factor angle for the welding transformer magnetizing current. The subsequent half cycle firing is according to an unique automatic power factor compensation feature to be described in greater detail later. If the control is in weld, the SCRs are fired. After the SCRs are fired, the voltage across them is examined to determine whether or not the SCRs actually did fire. If a voltage is present, it indicates a misfire and the fault code 98, half cycling is indicated in the data display 46. The voltage across the SCRs is again examined to determine if conduction did cease. If voltage across SCRs is not re-established after a period of time, a shorted SCR fault code 95 is indicated on data display 46. If the welding controller is in no weld, firing portion of this routine is by-passed. The line reference signal is used again to count weld cycles. If the weld is not complete, the microprocessor generates the proper heat control angle determined by the percent heats entered in the memory location. Note that if the MICC switch 76 is on, the heat control angle is determined by the percent heats entered in the MICC RAM locations. A cooling time, a second weld time, and a hold time are the next functions performed by the microprocessor. The COOL and HOLD and the WELD 2 squences follow the same routines as the squeeze time and weld 1 respectively. Briefly, the hold time is the time where the welding tips still apply pressure to the weld nugget but no current is flowing. This pressure is applied long enough for the molten material between the tips to solidify somewhat. Then an off time is generated in which the solenoid is de-energized moving the welding tips apart. If the welding controller switch 80 is in a non-repeat position, off time is not generated. The solenoid is de-energized and the control will hold at that point until all initiation switches are recognized as open. When this occurs, the controller goes back to the standby mode and again communicates continuously with the sequence module.

If the controller is in a repeat mode, off time is generated. Because of the delays in the relay isolated initiation circuit, off time must be at least 3 cycles or else the control will continuously cycle. This is because the controller would examine the initiation switches before they had a chance to drop out and re-initiate the sequence again. Because of this, if the off time is programmed to something less than 3 cycles in the RAM location, the microprocessor will automatically execute 3 cycles of off time. Also the off time gives an operator time to move the gun to a new location on the body of a car for example and to establish a rhythmic motion in working the gun. After the off time is completed, initiation switches are re-examined. If one of the initiation switches (triggers) that started the sequence is still closed, the controller will execute another complete sequence at the squeeze time. This continues as long as the initiation switch is held closed. When the trigger is opened, the welding controller will revert back to its standby mode.

After weld 2 time is completed, the MICC counter is updated. This counter is incremented only if the following conditions are met:

(1) MICC is on; (2) weld/no weld switch is in the weld position; and (3) the welding controller is not executing the sequence three.

Figure 4:
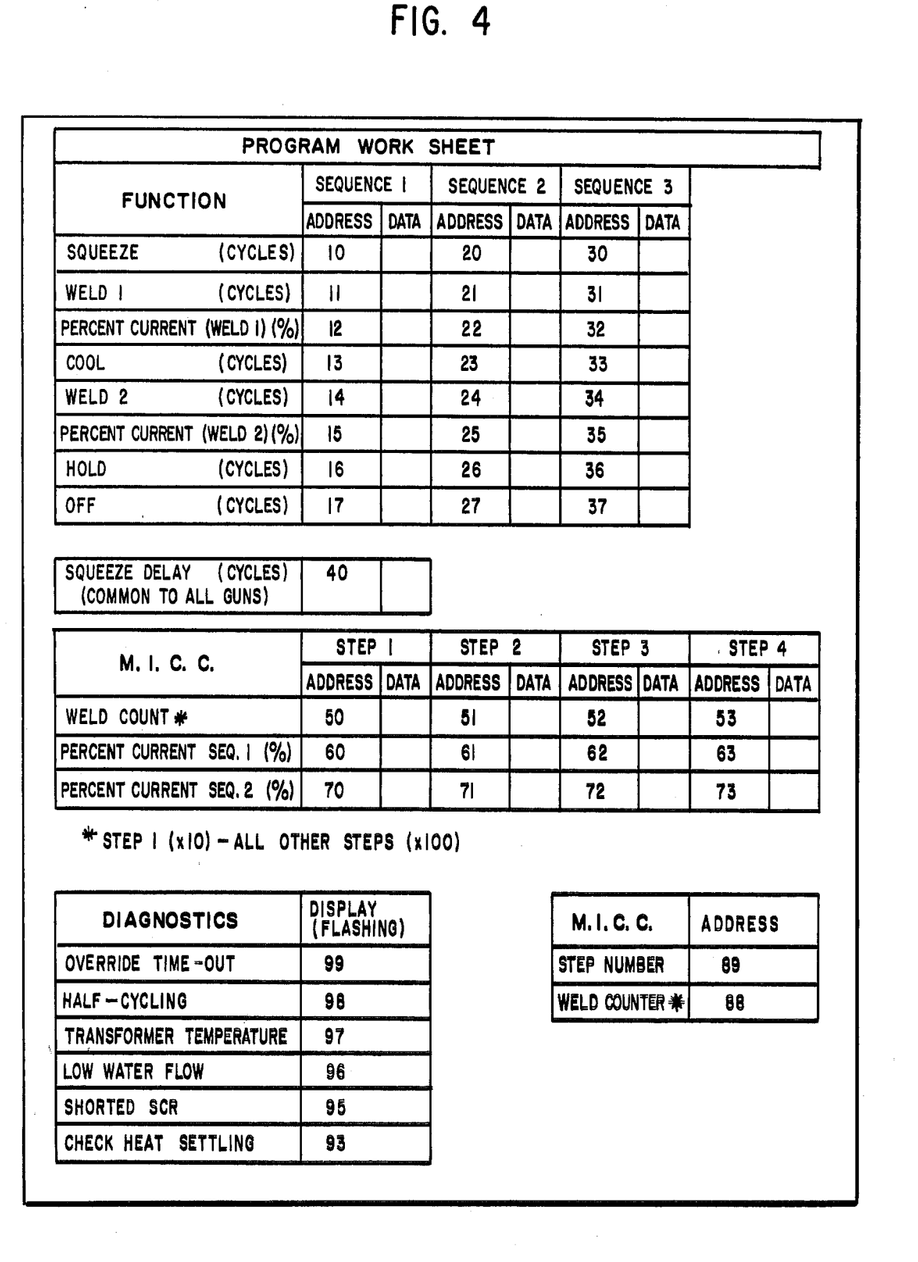
FIG. 4 is a card program work sheet carried by an operator for the welder control system and corresponding to the address program chart on the sequence module in FIG. 3.

Referring now to the diagnostic portion of the address program chart of FIG. 3 and the diagnostic portion of card program work sheet in FIG. 4, it can be seen that the welding controller circuit is designed to monitor six of the following malfunctions: (1) override timeout; (2) half cycling; (3) transformer temperature; (4) low water flow; (5) shorted SCR; and (6) check heat setting. If any of these six malfunctions is detected, the welding controller will immediately abort the weld sequence, de-energize the solenoid, and return to a standby mode. The data display 46 on the sequence module will flash the number corresponding to the particular malfunction. The controller cannot be re-initiated until the enter/reset pushbutton 74 on the sequence module is depressed and released or the controller power is turned off and then on again.

Briefly, prior art devices did little or nothing in the area of diagnosing malfunctions. Some malfunctions of the welding controllers are obvious and can be quickly diagnosed and remedied. However, in some instances, it is not readily apparent what is wrong with the welding controller. Six common problems encountered by welding controllers which are often difficult to diagnose were chosen and circuity was designed to highlight and identify each of these problems for the operator or electrician. The welding controller senses the existing signals in the control to generate the diagnostic messages. Thus, the diagnostics depend on monitoring already present signals for known states at specific times in the weld sequence. If the signals are in the states as expected no diagnostic is indicated. If, however, something is different than expected, the diagnostic is generated. The problems solved by this feature are eliminating or greatly reducing the time it takes to find and cure a problem which previously required a great deal of time and experienced personnel to correct the problem in order to keep the assembly line running. An explanation of each of these diagnostic messages follows.

There is an RC timer circuit external to the microprocessor and found on the I/O board which serves a watch dog function. Each timing period sequence is monitored by this circuit. The circuit times independent of the microprocessor. If there is a malfunction and any one of the timing periods exceeds 59 cycles, the watch dog timer circuit will time out, signaling the microprocessor that the override time-out condition has occurred. The microprocessor generates an output signal that stops the welding sequence, and resets the controller to a standby mode, and also generates a fault signal which preempts the current data on the LED data display and substitutes a display of a flashing 99 to indicate an override time-out.

If half-cycling of the welding controller occurs, a flashing 98 is displayed by the LED data display 46 and the previous data display is preempted as it is in the remaining diagnostic faults infra. For this fault, the microprocessor senses whether or not after a firing signal from the microprocessor to one or both of the SCRs of the thyristor contactor is given, did the SCRs, in fact, fire. If the SCRs failed to fire, the half-cycling malfunction is indicated by the flashing 98 to the data display 46 on the sequence module.

A transformer temperature malfunction is indicated by a flashing error numeral 97 on the data display 46. Some welding transformers have an over-temperature switch built into the transformer. If the user desires, this thermostat can be connected to the terminals marked TS1 and TS2 on FIG. 2 as previously described. The thermostat protects the transformer against a misapplication where the transformer could possibly get too hot. This thermostat is sensed by the microprocessor and if the thermostat opens indicating that the transformer is too hot, the microprocessor responds with the flashing error numeral 97.

If a low water flow occurs to the thyristor contactors (FIG. 2) a flashing error 96 will be displayed in the data display 46 on the sequence module. There is a thermostat mounted on the heatsink assembly which mounts the two SCR packages of the thyristor contactor. If for some reason the water flow to the thyristor contactor is insufficient or absent, the heat-sink temperature will rise and eventually get too hot. The thermostat will trip when the temperature gets too hot, and the microprocessor senses this tripping and shuts down the controller and returns it to standby and generates a signal for flashing 96 on the LED data display 46.

Figures 9B, 9C:
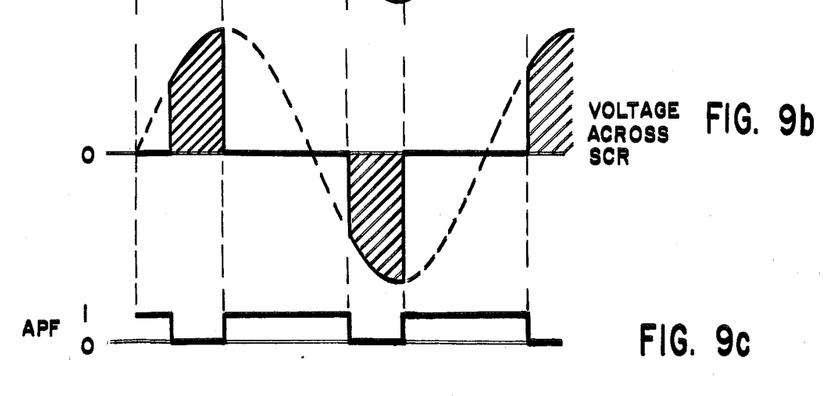

In the case of the shorted SCR, a flashing error numeral 95 is displayed in the data display 46 on the sequence module. The microprocessor again looks at the APF signal to sense a shorted SCR. In each of the timing periods, the thyristor contactor SCRs are monitored for a shorted condition. During the times when the SCR should be non-conducting, the APF signal should be a zero. This indicates voltage across the SCRs. If one of the SCRs is shorted, the APF signal will never go to a zero, as shown in FIG. 9C. If this happens, the microprocessor generates an error signal 95 to indicate that a shorted SCR has occurred.

The microprocessor monitors all of the heat settings in the RAM. These are locations 12, 15, 22, 25, etc. The microprocessor will detect if the percent current addresses contain a number other than 50–99, and a flashing error signal 93 will be displayed in the data display 46 on the sequence module. If an operator attempts to trigger a gun welder having a weld sequence which contains a percent current other than 50–99%, the sequence will abort and flash the 93 in the display 46. This check also pertains to percent current addresses associated with the MICC. Even though the controller prevents the entry of a number other than 50–99, it is possible that a particular address was never programmed, in which case that address would contain a random number not necessarily between 50–99. The flashing 93 is an indication to a maintenance man that there is an illegal heat setting somewhere in one of the RAM locations. The maintenance man or operator could remedy this by looking at the heat locations and putting in the proper heat setting in that location which contains the illegal one.

Figure 8A:
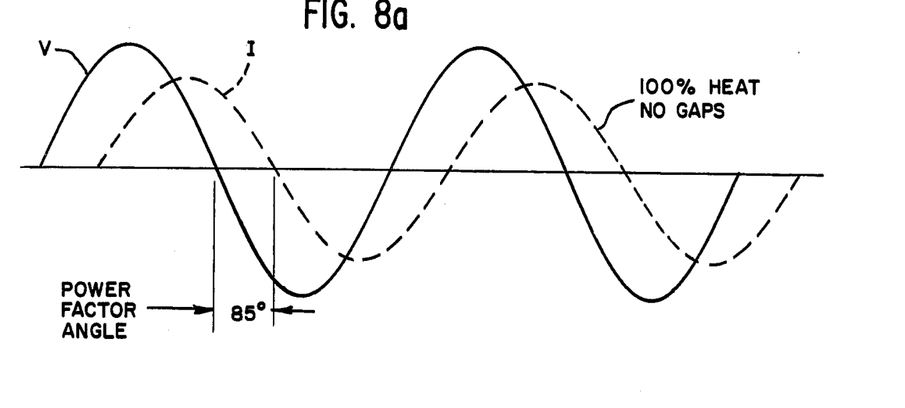
FIGS. 8A-C show current and voltage versus time diagrams which serve to explain the automatic power factor feature of the controller of FIG. 1.
Figure 8B:
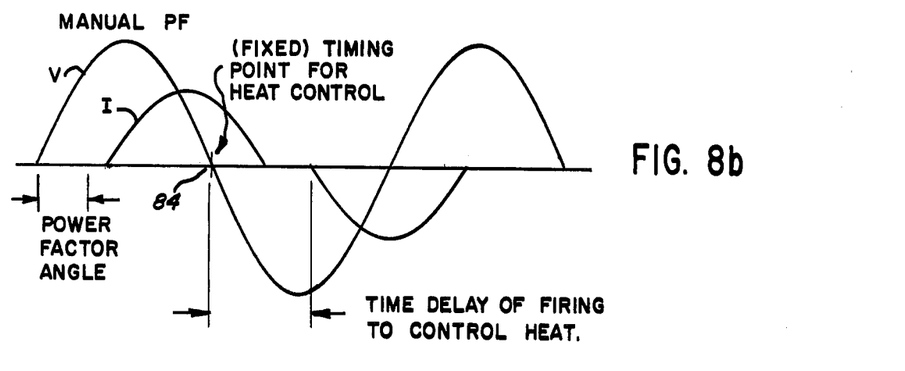
Figure 8C:
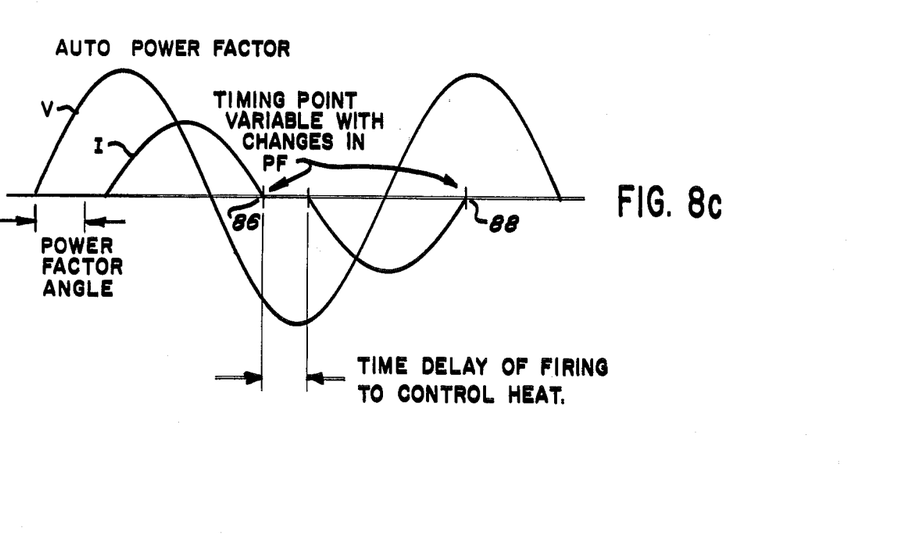

Referring now to FIGS. 8A–C, the automatic power factor(APF) and the unique digital phase shift heat control feature for the welding controller will be explained. FIG. 8A shows the AC line voltage $V_1$ and the line current $I_1$ for a 100% weld heat current setting having no time delay gaps between firing of the SCRs as shown in FIG. 8A. The natural power factor angle for a typical gun welding transformer load is approximately 35°–60° as shown in FIG. 8A. FIG. 8B shows a manual power factor set-up where a potentiometer or the like is tuned to the installation power factor. In the manual power factory set-up as in the automatic power factor set-up to be described infra, the first half cycle in any welding period is always fired at the natural power factor angle of 85° of the magnetizing current for a welding transformer. Subsequent half cycles of welding current are fired at various phase shifted angles to select the optimum welding current for the work piece. Now, in the manual power factor setting, the timing for the heat control is done from the zero crossing of the voltage wave form as indicated by reference numeral 84. So the zero crossing of the voltage wave form is the timing point for heat control in a manual power factor welding controller in which a potentiometer or the like is used to tune the welding controller to the power factor of the installation. Since the timing is fixed to a fixed reference point, the zero crossing of the voltage wave form, if the power factor varies the time delay gap between current loads will vary and the bottom line is that the heat setting is going to vary also. This system works fine if the power factor of installation remains constant. But in the real world this is usually not the case since a change of the work in the throat of the gun also changes the overall power factor of the installation along with it. Normally, the change of work pieces in the throat of the gun do not affect the power factor to a great degree, but there are measurable changes in the weld heat current because of it.

Since the phase shift heat control is essentially a timing function, the features of the welding controller, in the present invention are ideally suited for providing an automatic power factor correction scheme. Timing for the digital phase shift heat control of the welding controller proceeds from the end of current conduction of the previous half cycle of welding current to the firing point for the next half cycle of current as shown in FIG. 8C. The first half cycle of the weld is always fired at 85° after the zero crossing of the voltage wave form. Afer the first half cycle, all succeeding half cycles are referenced to the end of the current conduction of the previous half cycle. In this application, the microprocessor is a digital timer. This digital phase shift heat control for the welding controller is done by taking advantage of the fact that the time it takes for the microprocessor to execute a particular instruction is both fixed and known. The time delay is made by placing the microprocessor in a program loop immediately after the end of current conduction of the previous half cycle. The number of times the microprocessor goes through this loop determines the actual time delay before the next half cycle of welding current is initiated. The number of times the microprocessor enters this loop is stored in a location in the microprocessor's memory.

The user when setting up the weld sequence will enter the desired percent current in the RAM location of the microprocessor. The percent current, as discussed supra, has a range available between 50 and 99%. If the user desires a low heat setting and enters 50% for example, the delay between the end of the conduction of one-half cycle and the beginning of conduction of another will be long. The microprocessor will go through its delay loop the maximum number of times. The higher the heat setting desired, the smaller the number of times the delay loop is executed. In the present invention, the maximum delay required is 3.24 milliseconds. This corresponds to 70° on a 60 Hz. supply voltage. In the present invention, an operator can set the percent current between 50 and 99% in 1% increments. Thus each 1% increment is: Δ 1% = 3.24 MS/49= 66.1 us. A fixed program delay loop of approximately 66.1 microseconds will be constructed in the ROM memory. The number of times this loop is executed is determined by the heat settings the user makes. For example, a 64% setting would cause the loop to be executed 36 times (100 − 64 = 36). Note that the higher the heat setting the smaller the delay required, hence the subtraction from 100.

The advantage of using a digital phase shift heat control is that the real time delays generated are very accurate. As shown in FIG. 8C, the first half cycle of the welding time period is fired at the natural power factor angle of 85°, but each subsequent time delay gap is measured at the end of current conduction in each preceeding half cycle as indicated by reference numbers 86 and 88, respectively. Thus, the timing point is not fixed and varies with changes in the power factor so that the current heating settings are always accurate. The cyle time of the microprocessor is based on a crystal clock reference which is very stable. The prior art uses the RC time delay which is somewhat temperature dependent so that the delays would vary to a degree with temperature. The digital phase shift heat control also allows more precise setability of the percent current. For instance, there is a definite detent on each position of the data thumbwheel address 42 for a 1% increment in current heat. The prior art uses a continuously variable potentiometer which lacks precise known points corresponding to each 1% increment of heat the user might desire. Another advantage to the digitally generated delay is that when a logic panel is replaced and the setting duplicated, the percent current heat is exactly the same as it was with the old logic panel. In the prior art welding controllers using the RC timing, the inherent tolerance of the potentiomer could cause the same setting on the pot to produce as much as a ± 10% error on the actual percent current heat obtained.

The microprocessor generates the gap angles, or the delay angles between the current lobes digitally, and produces a weld signal which is fed from the microprocessor board to the power panel on incoming line 4PL7, as shown in FIG. 6. The weld signal is amplified by an amplifier circuit 90 which takes the weld signal from the microprocessor and provides a pulse voltage for the gates of the power SCRs. This pulse voltage is isolated from the logic by pulse transformer 4T and 5T. This voltage is a 20 microsecond wide pulse to the gates of the SCRs in the thyristor contactor as shown in FIG. 7 through plug connections 6PL3 and 6PL4 or 6PL5 and 6PL6, depending upon which half cycle is conduction, with a pulse occurring at every half cycle of weld current. The current in the gate of the SCRs during the 20 microsecond time rises to about 1 ampere and, once an SCR is gated, it stays on for the rest of the half-cycle. One SCR conducts in one direction and the other SCR conducts in the other direction to fire each one in order to get a complete weld cycle.

Referring now to FIGS. 9A–C, the microprocessor senses the voltage across the SCRs as an indication of an end of current conduction. When the current stops, the SCRs recover and the voltage across them snaps back to line voltage at that instant, as shown in FIG. 9B. When the SCRs are conducting and a weld heat is occurring, the voltage across the SCRs drops to zero. This transition from zero voltage back to line voltage across the SCRs is tapped off of the H1 terminal in the thyristor contactor, as shown in FIG. 7 on 6PL8 cable connection and is fed to a full wave bridge rectifier 92 in the power panel circuit as shown in FIG. 6. The signal which is across the line 1 and H1 terminals of the thyristor contactor serves as an input to an opto-isolator circuit 92 on the power panel. The opto-isolator is saturated when there is voltage present across the SCRs. The output of the opto-isolator circuit is fed to the I/O board, which in turn feeds the microprocessor. Upon receiving the signal, the microprocessor starts the digitally generated delay in the control at the end of which the next half cycle of current is fired. This sequence continues for all of the half cycles in the weld, each referenced from the end of current conduction from the previous half-cycle. This technique is very accurate, and also allows complete interchangeability of panels without any set-up by electricians. The power factor referred to in the above discussion relates to the power factor presented to the control by its secondary circuit. The secondary circuit includes the secondary cable, the gun, and the work within the throat geometry of the gun. Referring now to FIG. 9C, when the opto-isolator circuit is saturated when there is voltage present across the SCRs, the logic signal for the automatic power factor to the microprocessor is a logic zero. Conversely, when the SCRs have fired and are conducting the opto-isolator is off and the signal at cable 5PL14 in FIG. 6 is at the logic 1 to the microprocessor, hence the wave form shown in FIG. 8C.

Referring back to FIG. 4, a card program work sheet is shown. An operator can use this card as a guide in programming the welding controller. The programming work sheet card with the desired times and heats for the weld sequences to be used can be filled out by an operator supervisor or the like. Steps used to enter the work sheet information into the controller is as follows: (1) set the run/program key switch 44 to the program position; (2) set the address thumbwheels 40 to the address number to which data is to be entered (in FIG. 4, address 10 corresponds to the squeeze time for sequence (1); (3) set the data thumbwheels 42 to the number that is to be entered into location dialed by the address thumbwheels; and 4) (4) and release the enter/reset button 74. The data display 46 will change to correspond to the number on the data thumbwheels 42. This indicates that the data was successfully entered into the RAM memory of the microprocessor. This procedure is repeated until all entries are made. If a dual pulse weld schedule is not required, the user programs the cool and weld 2 timing periods to zero cycles. The controller is designed so that certain data entries that are not allowed are rejected, as previously stated. If such a data entry is attempted, the display will not change to match the data thumbwheels. Summarizing once again the rejected data entries are as follows: (1) a number greater than 59 in one of the timing periods; (2) a number less than 50 in one of the percent heats; and (3) any alteration of any address not shown on the programming work sheet.

We claim:

1. A digital welder control system for a portable gun welder of the type connecting and disconnecting a welding transformer load from an electrical source to control the timing periods of the welding sequence and the level of heat intensity in the weld, comprising:
a means responsive to manual actuation for producing a plurality of output signals representing timing period and weld heat constants of the welding sequence;

a sensing means responsive to the end of current conduction in each half-cycle of a welding period for generating an automatic power factor signal having a timing point which varies with changes in the power factor of the welding installation; and a digital control means, responsive to the heat, period, and automatic power factor signals and having a fixed and known cycling time to execute a particular instruction so that by placing the control means in a programmed loop after the automatic power factor signal is sensed, a real time delay is produced, for generating a digital phase shift heat control weld firing signal and for generating each of the timing periods within the weld sequence.

2. The welder control system of claim 1 wherein said control means includes a memory means for storing the timing period and weld heat constants of each welding sequence and a programmed memory means having range limits for the timing period and weld heat constants for comparing the timing period and weld heat constants to the range limits before the timing period and weld heat constants are entered into an active location in said memory means for accessing by the control means during a weld sequence.

3. The welder controller of claim 1 wherein each of said means are plug-in, self contained, modular units and have a means for electrically connecting to an interconnecting electrical network with quick disconnect plugs between each of the modular units so that any one modular unit can be replaced easily.

4. The welder control system of claim 1 wherein said control means includes a means responsive to existing signals in the control system for detecting malfunctions within the control system and for generating diagnostic signals corresponding to the malfunction detected and a means responsive to a diagnostic signal to immediately abort the weld sequence, de-energize the solenoid of the portable welder gun and to return the control system back to a standby mode.

5. The welder control system of claim 4 in which the manually actuated producing means is a sequence module and the digital control means is a microprocessor having a random access memory for storing the timing period and weld heat constants of the welding sequence and a read only memory for storing the executive program which interrogates and compares the incoming output signals from the producing means to the random access memory, said sequence module including address thumbwheels to address the location in the random access memory in which data is to be entered, data thumbwheels for dialing the data to be entered into location in the random access memory which is on the address thumbwheel, a LED data display displaying the data stored in the access memory location which is dialed on the address thumbwheels, a run/program switch which is switched to the program position when programming the microprocessor and is switched to the run position when it is desired to run a welding sequence, and address program chart listing the locations for setting the address thumbwheels in programming the microprocessor and other information for diagnosing malfunctions, and a set of switches for entering the data in the microprocessor and for controlling the welding controller, said sequence module further including means responsive to the diagnostic signals for producing a numeral indication on the LED data display.

6. The welder control system of claim 1 further including a maintenance interval counter and compensator means having a four-step, stepper function to automatically increase the weld heat after a preset number of welds in each step to compensate for electrode mushrooming.

7. In a digital welder control system for controlling a portable gun welder of the type used in automotive industry in an assembly line having a microprocessor as its main control element, a sequence module with operators for programming the weld sequence of the microprocessor including a run/program key switch, address thumbwheels to select an address location in the memory of the microprocessor, data thumbwheels to dial timing period and weld constants to be entered into the memory location dialed by the address thumbwheels, and an enter/reset button for entering the data selected, a method of programming the digital system comprising the steps of:

utilizing a card program worksheet containing the timing period and welding heat constants to be used in a weld sequence;

setting the run/program key switch to the program position;

setting the address thumbwheels to the address location in the memory corresponding to the memory located on the programming card for which data is desired to be entered;

setting the data thumbwheel to the number that is to be entered into the location dialed by the address thumbwheels which corresponds to welding schedule on the programming card; and pressing and releasing the enter/reset button to enter the constants into the microprocessor for controlling weld sequence.

8. A method according to claim 7 in which rthe microprocessor further includes a maintenance interval counter and compensator means having a four step, stepper circuit to automatically increase the weld heat after preset number of welds in each step to compensate for electrode mushrooming and the sequence module includes a maintenance interval counter and compensator on/off switch and a maintenance interval counter and compensator step advance switch, and further including the steps of:

switching the maintenance interval counter and compensator switch into its operative position in which the welds are counted and the previously entered weld heat constants are preempted for weld constants entered into the maintenance interval counter and compensator memory location in the microprocessor; and depressing the maintenance interval counter and compensator step advance switch when greater wear of the electrode tips occur than normal to advance to the next step in the stepping program.

9. In a digital welder control system for selectively connecting a load having a power factor to a source of alternating voltage during at least a portion of the half-cycle of alternating voltage for each weld, a method of controlling a welding system comprises steps of:

providing an automatic power factor signal when the end of the current conduction of the previous half-cycle is sensed;

placing the microprocessor in a program loop which takes a known and fixed time to execute upon the occurrence of a power factor signal for generating a time delay;

controlling the connection of load to the source by a weld firing signal from the microprocessor; and initiating a preselected number of times for the microprocessor to go through its loop to determine the actual time delay before the next half-cycle of welding current is initiated by the weld firing signal for the microprocessor.

* * * * *